(12) United States Patent
Spoeler et al.

(10) Patent No.: US 6,571,970 B1
(45) Date of Patent: Jun. 3, 2003

(54) MONORAIL TELESCOPIC CARRIER

(75) Inventors: Hans-Gerd Spoeler, Borken (DE);
Juergen Cittrich, Wetter (DE)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 48 days.

(21) Appl. No.: 09/688,477

(22) Filed: Oct. 16, 2000

(51) Int. Cl.$^7$ .............................................. B66C 19/00
(52) U.S. Cl. ....................... 212/333; 212/319; 187/254; 414/253; 254/387
(58) Field of Search ................................ 187/203, 224, 187/226, 235, 238, 240, 254, 262, 406; 212/333, 319; 254/387; 414/626, 659, 660, 253, 255, 259, 260, 281

(56) References Cited

U.S. PATENT DOCUMENTS

| | | | | |
|---|---|---|---|---|
| 796,842 A | * | 8/1905 | Hoffmann et al. | 414/626 |
| 2,835,520 A | * | 5/1958 | Schiring et al. | 248/333 |
| 3,109,545 A | * | 11/1963 | Hedin | 414/626 |
| 3,776,500 A | * | 12/1973 | Foderaro | 248/333 |
| 3,825,107 A | * | 7/1974 | Cary et al. | 212/348 X |
| 3,887,155 A | * | 6/1975 | Bertalot | 248/333 |
| 4,057,891 A | * | 11/1977 | Amor, Jr. et al. | 29/434 |
| 5,156,513 A | * | 10/1992 | Galan et al. | 414/281 X |

FOREIGN PATENT DOCUMENTS

| | | | |
|---|---|---|---|
| CH | 433645 | 9/1967 | B66C/3/02 |
| DE | 34 14701 A1 | 10/1985 | B66C/17/06 |
| DE | 43 26563 A1 | 8/1993 | B66C/11/12 |
| DE | 42 19370 A1 | 12/1993 | B66C/17/20 |
| DE | 9408846 | 10/1994 | B66C/1/22 |
| DE | 9408847 | 10/1994 | B66C/1/24 |

OTHER PUBLICATIONS

Prospect "Ketten Reaktionene" —"No Limits.", company: igus.

3 photos "Doppelspur—Langhubgehange", company: Mannesmann Dematic.

* cited by examiner

Primary Examiner—Eileen D. Lillis
Assistant Examiner—Thuy V. Tran
(74) Attorney, Agent, or Firm—Van Dyke, Gardner, Linn & Burkhart, LLP

(57) ABSTRACT

A load carrier for supporting, raising or lowering a load includes a frame member, a telescoping mast, and a support frame. The frame member is adapted for being movably supported by a rail. The telescoping mast is supported by the frame member, with the support frame supported by the telescoping mast. The telescoping mast includes at least one fixed mast section and at least one movable mast section, with the support frame being coupled to the movable mast section. The movable mast section is supported for movement between a plurality of extended positions in which the support frame is lowered and raised with respect to the frame member and the fixed mast section with the movable mast section being guided by the fixed mast section when the movable mast section is moved to its extended position. The driver selectively moves the movable mast section to its extended position and includes at least one cord for raising and lowering the movable mast section. The cord is arranged by whereby the cord bends in a single direction to eliminate back bending in the cord thereby increasing the longevity of the cord. In preferred form, the telescoping mast includes a second movable mast section, which is synchronized with the first movable mast section whereby the first and second movable mast sections move in substantially the same direction at about the same speed. The first and second mast sections, for example may be supported for movement in the first movable mast section by a plurality of guide rods and guide pulleys which cooperate to guide the first and second movable mast sections in a manner to minimize play between the first movable mast section, the second movable mast section, and the fixed mast section, thus permitting the movable mast sections to be moved at a greater speed.

61 Claims, 16 Drawing Sheets

MONORAIL TELESCOPIC CARRIER

BACKGROUND OF THE INVENTION

The present invention relates to a telescoping carrier which is suitable for use on a suspended rail system, including a monorail system, such as used in areas of production, including for example body shops, assembly shops, and other assembly or manufacturing facilities.

In conventional production line type facilities, components which are manufactured or assembled, are often required to be moved between stations where various assembly or manufacturing processes are performed on the component. Where large components are handled, such as in an auto assembly plant, often, the components are supported on a rail which runs across the production area floor to permit the components to be transferred between the various stations on the rail. However, depending on the function to be performed at the respective station, the component may require lifting or lowering in order to perform the designated function on the component. Typically, stations that require the component to be raised or lowered are provided with a lift assembly or mechanism which permits the operator of the station to lower and raise the component for performing their specific function. The rail support system, however, occupies a significant amount of space of the production area floor. Further, since each component is lowered or raised when it reaches the respective station, the process of lifting and lowering the product increases the cycle time for the production process. Furthermore, present systems do not provide the flexibility of adding or removing stations without a total overhaul of the whole production line.

Consequently, there is a need for a system which will reduce the cycle time of the production process while providing increased flexibility so that the system can be modified to accommodate an increase, decrease or change in the stations in the production line.

SUMMARY OF THE INVENTION

Accordingly, the present invention provides a lift carrier that is adapted for use on a suspended rail system which lowers and raises large components, such as vehicle bodies, in a manner that reduces the process cycle time and, further, in a manner that consumes less floor space. In addition, the lift carrier provides flexibility so that the assembly or manufacturing process can be modified without a complete overhaul of the whole system.

In one form of the invention, a load carrier for supporting, raising or lowering a load includes a frame member, which is adapted to be movably supported by a rail, a telescoping mast, which is supported by the frame member, and a support frame. The support frame is supported by the telescoping mast and is adapted for supporting a load. The telescoping mast includes at least one fixed mast section and at least one movable mast section. The support frame is coupled to the movable mast section, which is supported for movement between a plurality of extended positions in which the support frame is lowered and raised with respect to the frame member and the fixed mast section. The movable mast section is guided by the fixed mast section when the movable mast section is moved to its extended positions. The load carrier further includes a driver which selectively moves the movable mast section to the extended positions and which includes at least one cord for raising and lowering the movable mast section with respect to the fixed mast section and the frame member. The cord is arranged whereby the cord bends in a single direction to eliminate back bending in the cord thereby increasing the longevity of the cord.

In one aspect, the movable mast section includes a lift sheave. The driver includes a cord drum with the cord extending from the cord drum over a redirection sheave down the mast and around the lift sheave. The cord extends from the lift sheave over a second redirection sheave to a cord clamp whereby the cord raises or lowers the movable mast section when the drum rotates.

In other aspects, the fixed mast section includes an interior passageway. The movable mast section is positioned in the passageway and moves through the interior passageway when the movable mast section is moved to its extended positions. Preferably, the movable mast section is guided by a plurality of guide bars when the movable mast section is moved through the interior passageway. In preferred form, the fixed mast section includes a first set of guide bars, with the movable mast section including a second set of guide bars, which guide the movable mast section through the fixed mast section.

In yet further aspects, each of the fixed mast section and a movable mast section includes a corresponding set of guide rollers for engaging the guide bars whereby the guide rollers and the guide bars guide the movable mast section to move to its extended position. For example, the guide bars may comprise cylindrical rods. Preferably, the guide bars are tensioned to reduce play between the movable mast section and the fixed mast section. Preferably, the guide bars are tensioned at their opposed ends.

According to another form of the invention, a load carrier for supporting, raising or lowering a load includes a frame member, which is adapted for being movably supported by a rail, a telescoping mast, which is supported by the frame member, and a support frame which is supported by the telescoping mast. The telescoping mast includes at least one fixed mast section and first and second movable mast sections. The load frame is mounted to the second movable mast section, with the first and second movable mast sections being supported for movement between extended positions in which the support frame is lowered and raised with respect to the frame member and the fixed mast section. The first movable mast section is guided by the fixed mast section, with the second movable mast section being guided by the first movable mast section when the first and second movable mast sections are moved to there extended positions by a driver. The driver moves the first and second movable mast sections to thereby lift and lower the support frame. The first and second movable mast sections are synchronized to move substantially in the same direction at about the same speed by at least one synchronizing cord.

Preferably, the first and second movable mast sections are synchronized to move substantially in the same direction at about the same speed by a pair of synchronizing cords, with one of the cords being coupled to the first and second mast sections, and the other of the cords being coupled to a fixed portion of a load carrier and one of the first and second movable mast sections.

In other aspects, the first and second mast sections are guided along the fixed mast section by a plurality of guide rollers. For example, the fixed mast section preferably includes a first set of the plurality of guide bars, with the first movable mast section including a second set of the plurality of guide bars. The first and second guide bars guide the first movable mast section along the fixed mast section.

In further aspects, the first movable mast section includes a third set of the guide bars, with the second mast section being guided along the first movable mast section by the third set of guide bars. Preferably, the fixed mast section includes a corresponding set of guide rollers for engaging the second set of guide bars of the first movable mast section. In addition, the first movable mast section includes a corresponding set of guide rollers for engaging the guide rollers of fixed mast section to guide the first movable mast section along the fixed mast section. In yet further aspects, the second movable mast section includes a corresponding set of guide rollers for engaging the third set of bars of the first movable mast section. In further aspects, the second movable mast section includes a fourth set of the guide bars with the first movable mast section including a corresponding set of guide rollers for engaging the fourth set of guide bars. It can be appreciated that the first and second movable mast sections are guided as they move between their extended positions in a manner that reduces the play between the movable mast sections and the fixed mast section and further in a manner that results in the movable mast sections moving in substantially parallel directions thus reducing the risk of binding.

According to yet another form of the invention, a load carrier for supporting, raising or lowering a load includes a frame member, a telescoping mast, which is supported by the frame member, and a support frame which is supported by the telescoping mast. The telescoping mast includes at least one fixed mast section and first and second movable mast sections, with the support frame being supported by the second movable mast section. The first and second movable mast sections are supported for movement between extended positions in which the support frame is lowered with respect to the frame member and retracted positions in which the support frame is raised with respect to the frame member. The telescoping mast includes a plurality of guide rods, with the first and second movable mast sections being guided by the guide rods when moved between extended and retracted positions within the fixed mast section. A driver lowers and raises the first and second movable mast sections to thereby lower and raise the load.

Preferably, the guide rods are tensioned to minimize play between the movable mast sections and the fixed mast section. In other aspects, the driver includes at least one cord, which is coupled to the second movable mast section and lifts and lowers the second movable mast section to thereby lift and lower the first movable mast section. Preferably, the first and second movable mast sections are synchronized to move substantially in the same direction at about the same speed. For example, the first and second movable mast sections may be interconnected, such as at least one synchronizing cord, whereby they move substantially in the same direction at about the same speed.

These and other objects, advantages, purposes, and features of the invention will become more apparent from the study of the following description taken in conjunction with the drawings.

DETAILED DESCRIPTION OF THE DRAWINGS

Figure 12:
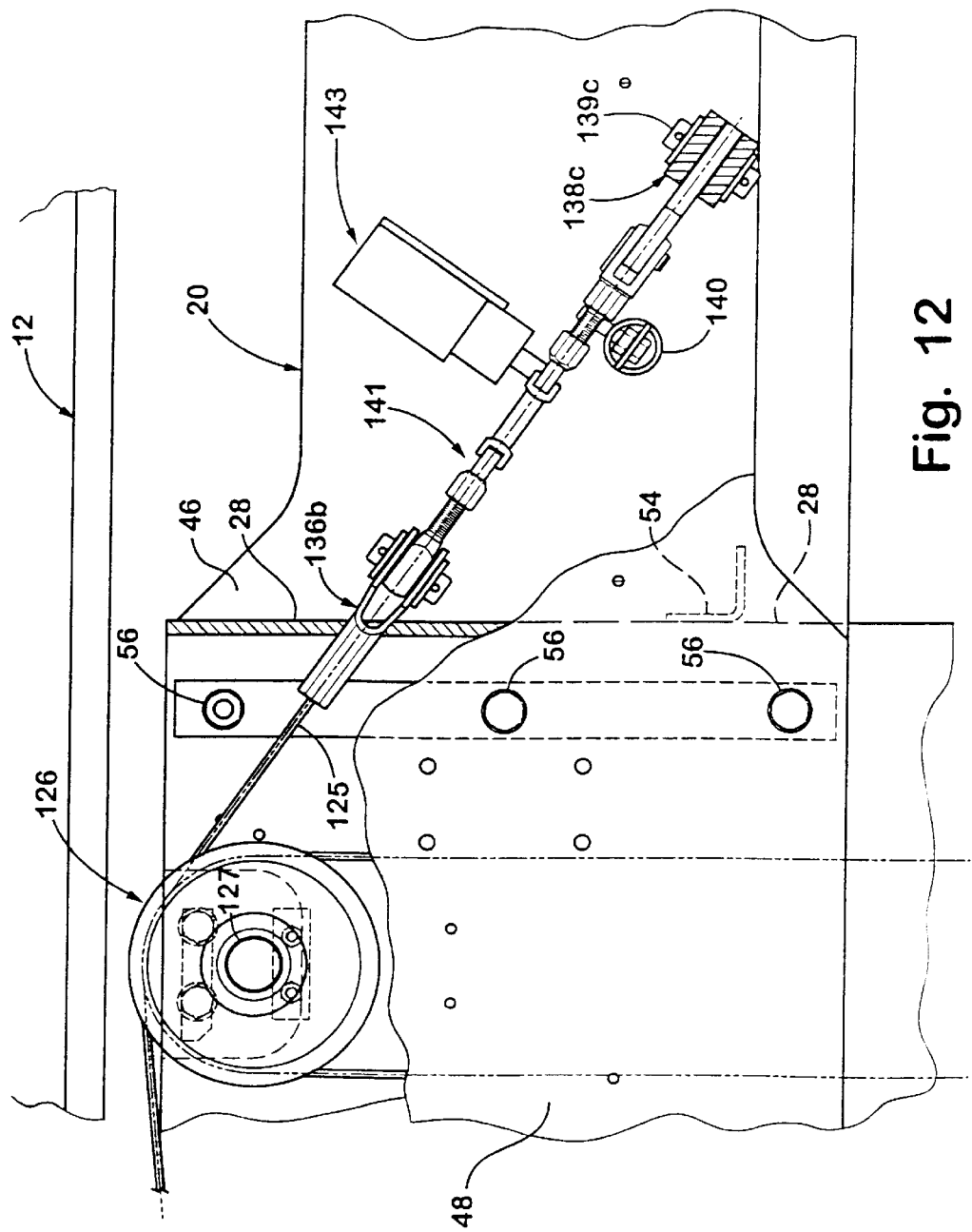
Figure 13:
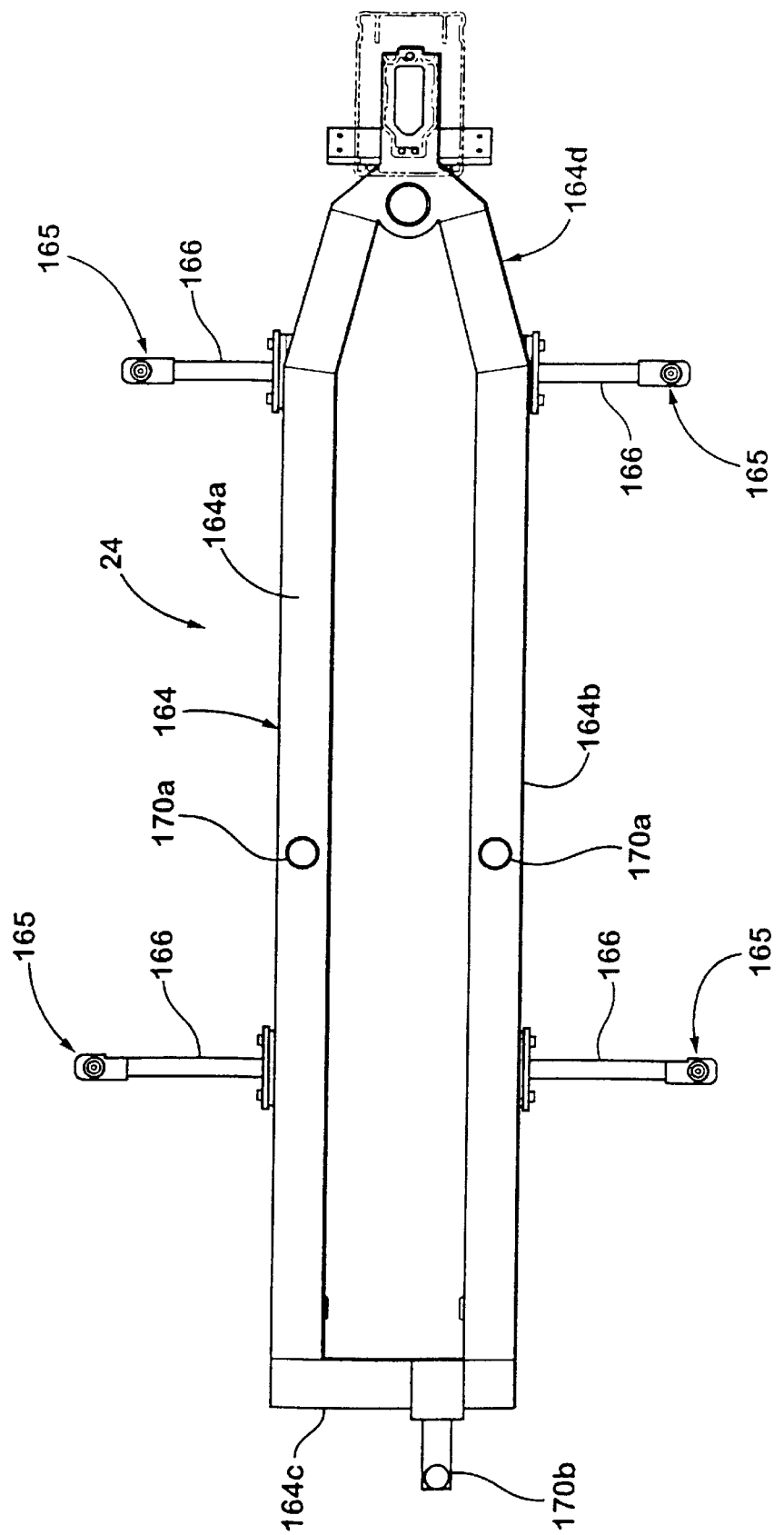
Figure 14:
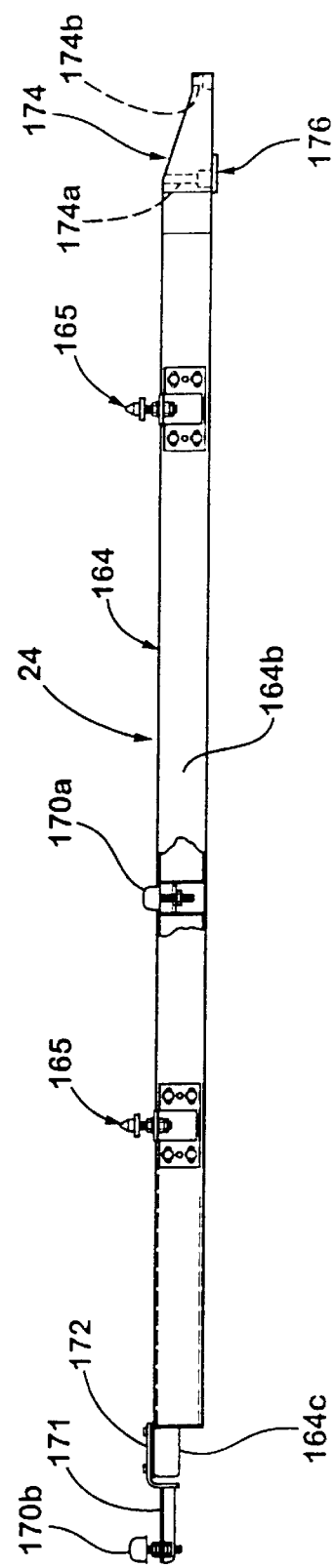
Figure 15:
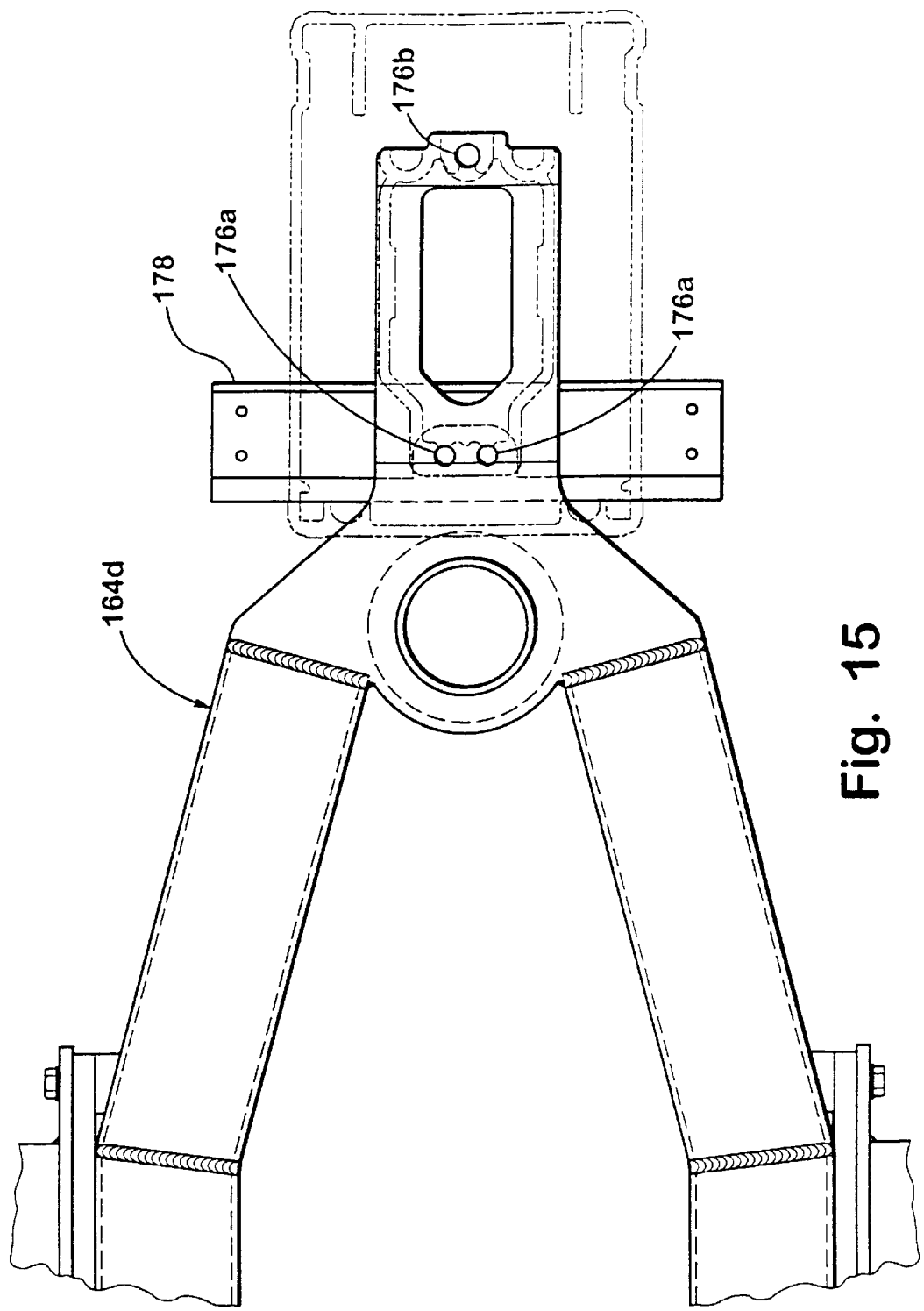
Figure 16:
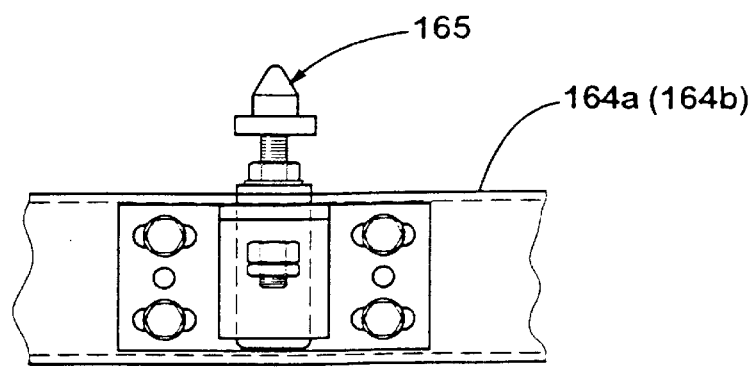
Figure 17:
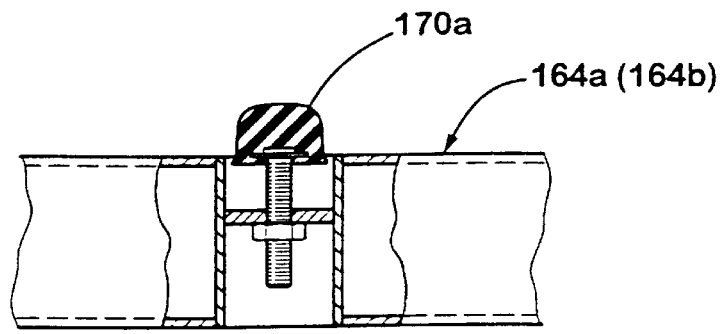

FIGS. 11(*a*) and (*b*) are detailed view of the mounting arrangement of the second synchronizing cord to the second movable mast section;

FIG. 12 is an enlarged view of the anchoring of the drive cord to the load frame member;

FIG. 13 is a plan view of the load support frame;

FIG. 14 is a side elevation of the load support frame of FIG. 13;

FIG. 15 is an enlarged plan view of the connection between the load support frame and the telescoping mast;

FIG. 16 is an enlarged view of a load support of the load support frame;

FIG. 17 is an enlarged elevation of a bumper of the load frame support; and

Figure 18:
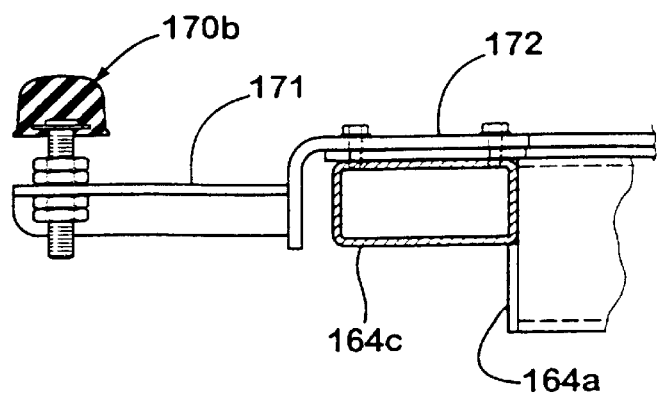

FIG. 18 is an enlarged elevation of a mounting arrangement of one of the bumpers of the load support frame.

DETAILED DESCRIPTION OF THE PREFERRED EMBODIMENT

Figure 1:
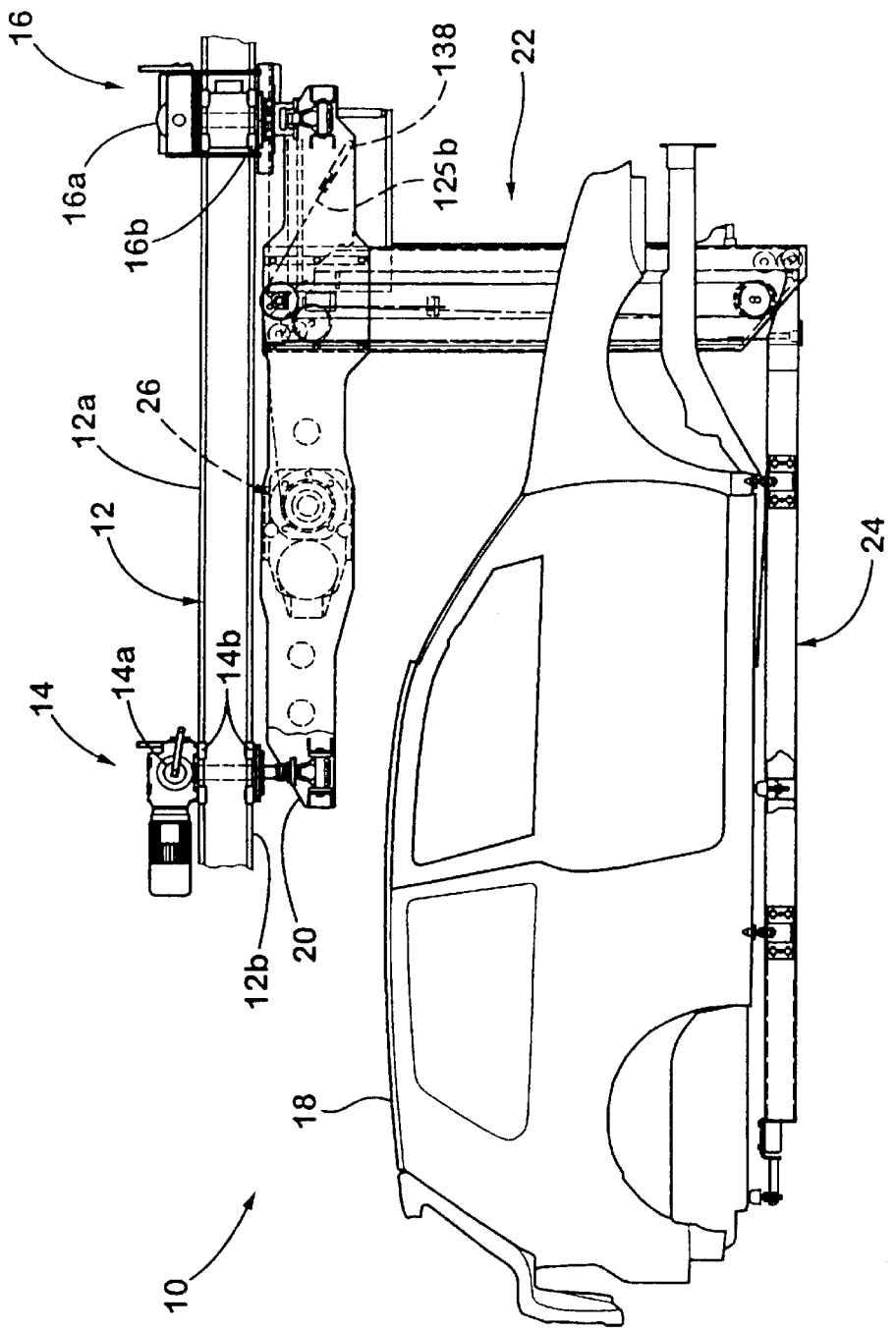
FIG. 1 is an elevation view of a telescoping lift carrier of the present invention supported by a rail system illustrating the lift carrier in a retracted configuration.

Referring to FIG. 1, the numeral 10 generally designates a telescoping carrier of the present invention. In the illustrated embodiment, telescoping carrier 10 is adapted to be supported by a rail 12, such as a monorail of a monorail system. In preferred form, telescoping carrier 10 is moved along rail 12 by a carrier drive unit 14 and an idler trolley assembly 16. Drive assembly 14 and idler trolley assembly 16 each include a wheel 14*a* and 16*a*, respectively, which runs along an upper surface of upper flange 12*a* of rail and a plurality of guide wheels or rollers 14*b* and 16*b*, respectively, that engage the outer ends of upper and lower flanges 12*a* and 12*b* of rail 12 to translate telescoping carrier 10 along rail 12 for repositioning along the rail system, such as in an area of production including body shops, assembly shops, and other assembly or manufacturing facilities. Typically, rail 12 is suspended and supported by the roof system of the production area building and is arranged to permit lift carrier 10 to be quickly and easily moved through the production area to position carrier 10 at a station in which various functions are performed on the component being transported by carrier 10. For example, carrier 10 is particularly suitable for supporting large components, such as a body 18 of a vehicle. As will be described in greater detail below, carrier 10 is adapted to raise and lower the component being transported, such as vehicle body 18, so that the object can be moved between stations and repositioned as needed in a highly efficient manner which reduces the production system cycle time. In addition, carrier 10 provides for selective lowering and raising of the object so that stations can be added, removed, or rearranged to change the flow of the production through the production area.

Referring again to FIG. 1, carrier 10 includes a primary load frame member 20 and a telescoping mast 22, which is secured to load frame member 20. Mast 22 supports a load support frame 24, which is adapted to support a component, such as vehicle body 18, thereon. As will be more fully discussed below, mast 22 is adapted to adjust between retracted and extended configurations in which load support frame 24 is moved to a plurality of positions to lower and raise vehicle body 18. Mast 22 is adjusted between its extended and retracted configurations by a driver or lift assembly 26, which is described in greater detail in reference to FIGS. 3–9.

Figure 3:
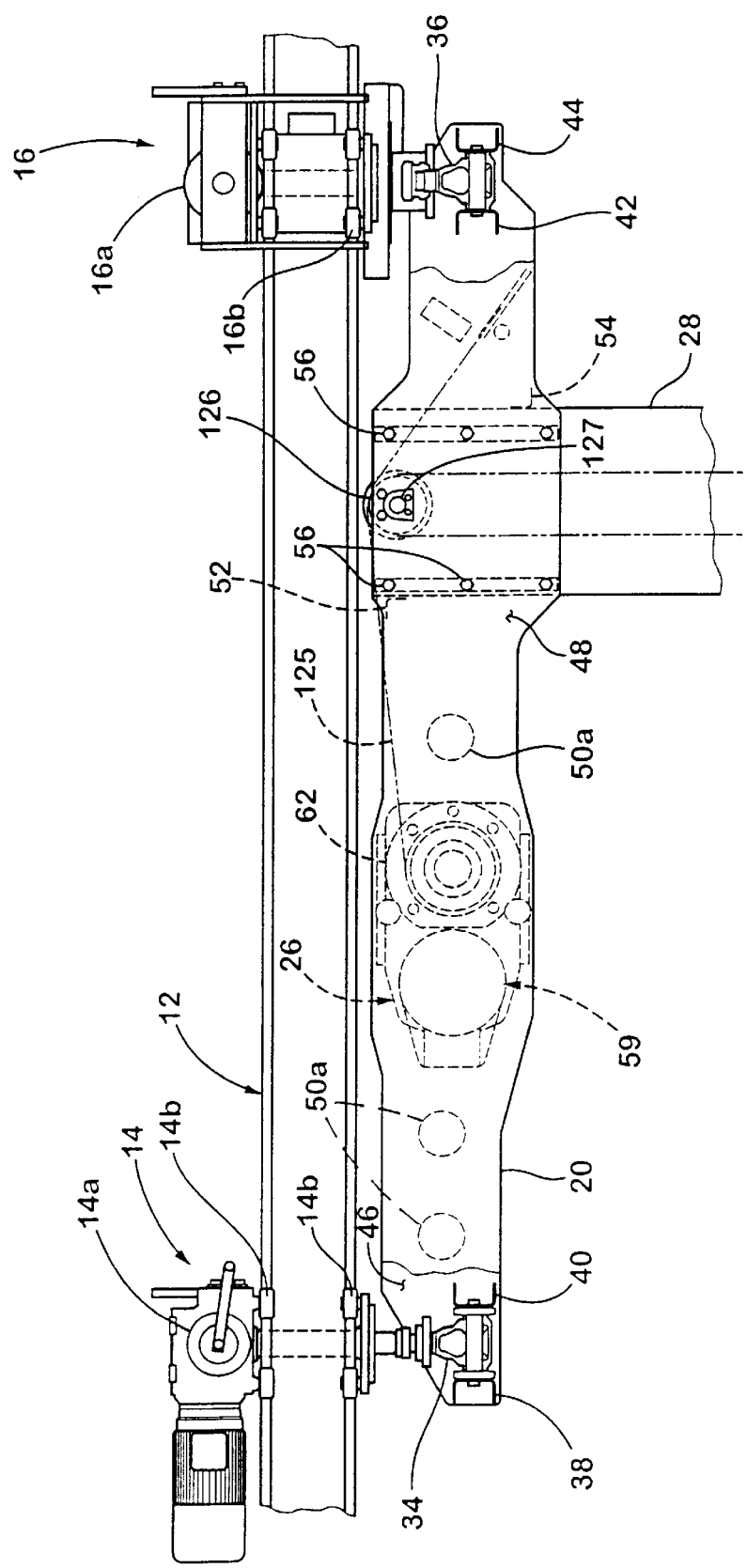
FIG. 3 is an enlarged side elevation view of the primary load frame member of the lift carrier of FIGS. 1 and 2.
Figure 4:
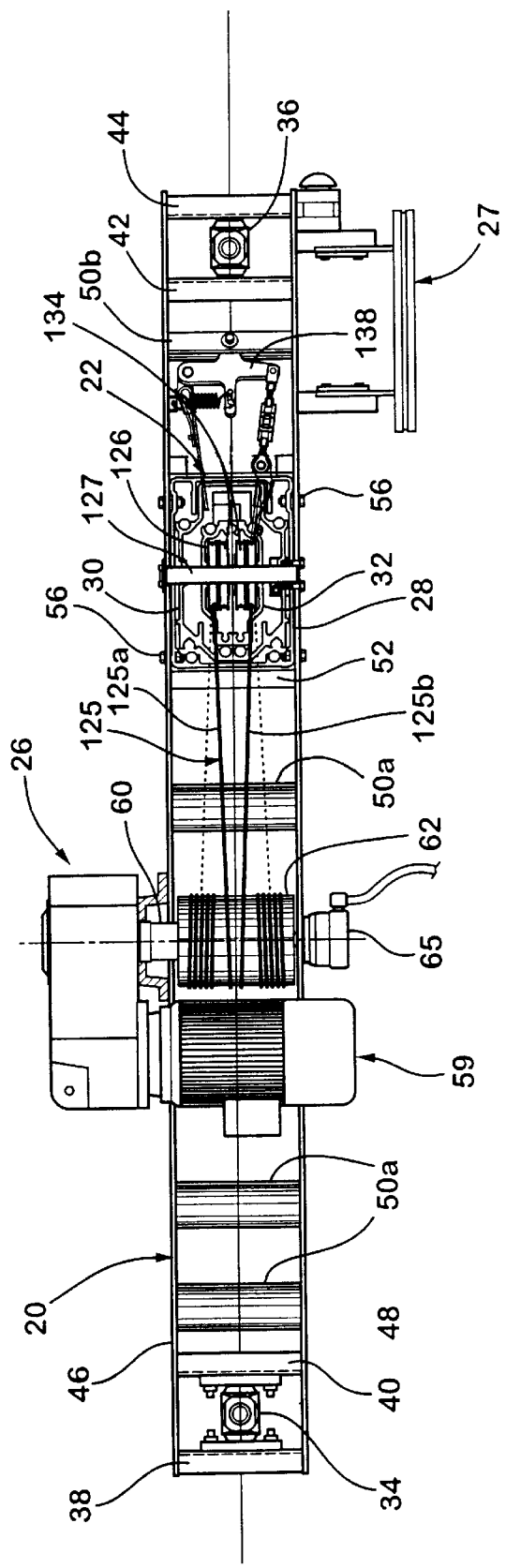
FIG. 4 is a plan view of the primary load frame member of FIG. 3.

As best seen in FIG. 3, primary load frame 20 is suspended from rail 12 by driver assembly 14 and idler trolley assembly 16 and are supported on a pair of load bearing supports 34 and 36 which respectively mount to cross-frame members 38, 40, 42, and 44 of load frame member 20. Further details of driver assembly 14 and idler trolley assembly 16 are not provided herein as they are of conventional design, such as is available from Mannesmann Dematic of Germany. As best seen in FIG. 4, load frame member 20 comprises a weldment formed from a pair of side plate members 46 and 48 which are interconnected by cross-frame members 38, 40, 42, and 44, noted above, and intermediate cross-frame members 50a, 50b, 52, and 54. In this manner, load frame member 20 comprises a rigid open frame. Mounted between side frame members 46 and 48 is telescoping mast 22, which is secured to side frame members by fasteners 56, such as bolts, which extend through side frame members 46 and 48 and through the side walls of mast 22.

Figure 2:
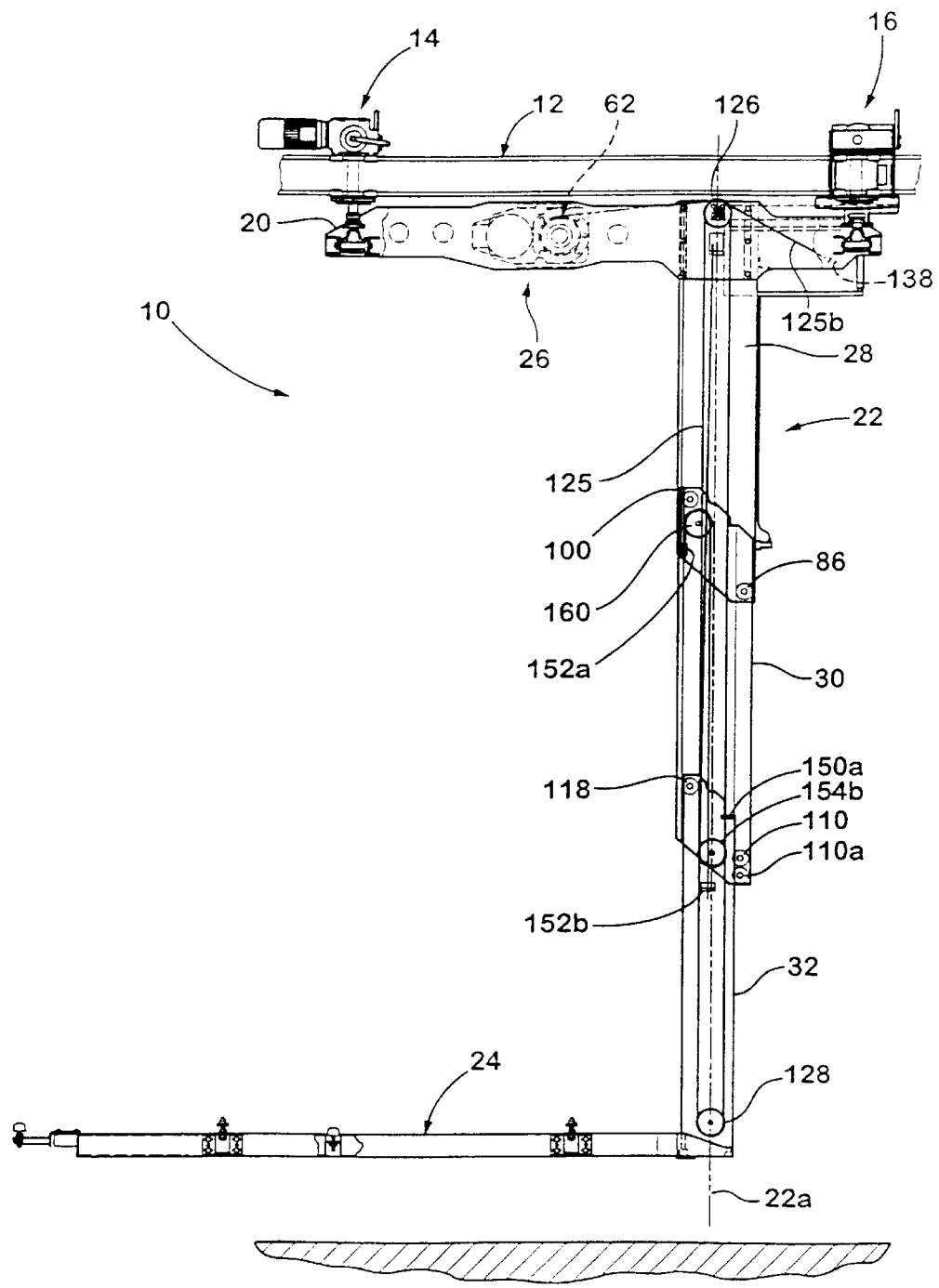
FIG. 2 is an elevation view similar to FIG. 1 illustrating the telescoping lift carrier in an extended configuration.
Figure 3A:
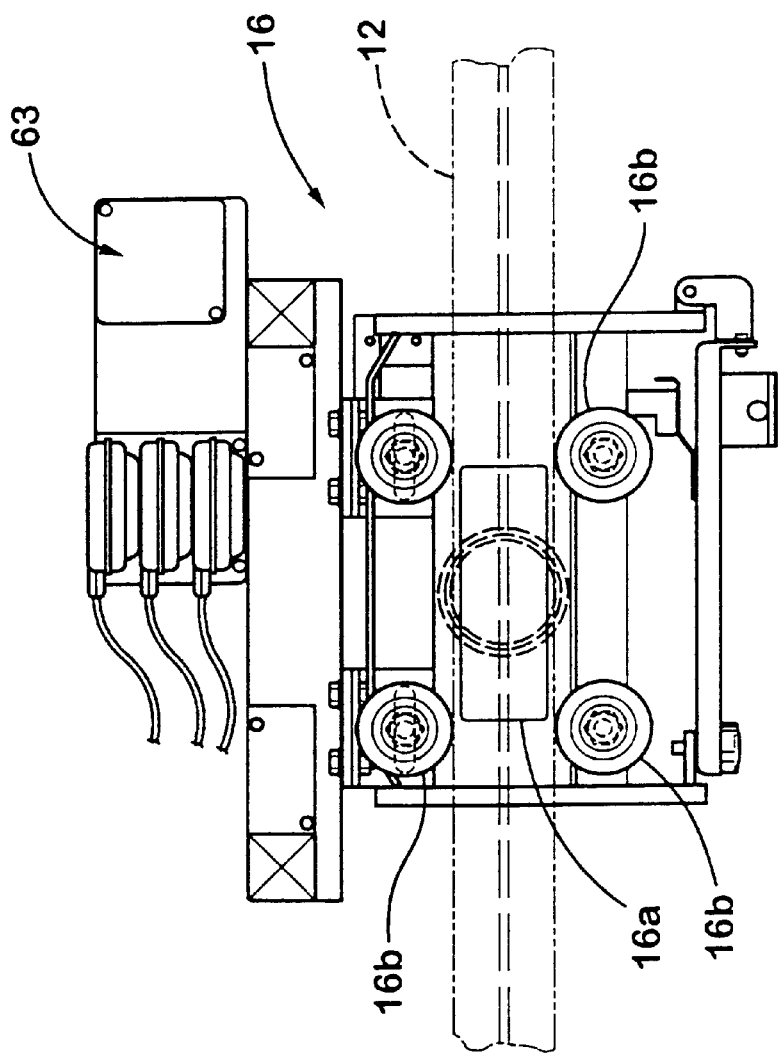
FIG. 3A is an enlarged plan view of the trolley assembly of FIG. 3.

Lift assembly 26 is mounted to load frame member 20 and includes a motor 59 with a drive shaft 60 which drivingly couples to a cord or cable drum 62. In order to counter balance the weight of lift assembly 26, load frame member 20 preferably includes a counter weight 27 (FIG. 4). Cable drum 62 is used to adjust the configuration of mast 22, as will be more fully described below. Lift assembly 26, driver assembly 14, and idler trolley 16 are each in communication, for example by wiring, to a control box 63 (FIG. 3A) which is mounted to trolley assembly 16. Referring to FIG. 2, mast 22 includes a fixed mast section 28 and at least one movable mast section 30 and, more preferably, two movable mast sections 30 and 32, with load support frame 24 being coupled to the lowermost movable mast section, such as movable mast section 32. Fixed mast section 28 is secured between side frame members 46 and 48, while movable mast sections 30 and 32 are movably mounted in fixed mast section 28 by lift assembly 26 and by guide members, which will be more fully described in reference to FIG. 6. Lift assembly 26 selectively raises and lowers movable mast sections 30 and 32, as will be more fully described below, in order to raise and lower load support frame 24 and in turn vehicle body 18 and, preferably, raises and lowers movable mast sections 30 and 32 in a synchronized manner.

As previously described, telescoping mast 22 includes fixed mast section 28, first movable mast section 30 and second movable mast section 32, which are configured to form a nesting arrangement in which second telescoping mast section 32 is nested within first telescoping mast section 30, which in turn is nested in fixed mast section 28.

Preferably, mast sections 28, 30, and 32 are extruded members and, more preferably, are extruded aluminum members which include respective longitudinal passageways 28a, 30a, and 32a. When moved, movable mast sections 30 and 32 are guided in fixed mast section 28 preferably by a plurality of guide bars 66 and a corresponding plurality of rollers whereby the play between movable mast sections 30 and 32 and fixed mast section 28 is reduced, which minimizes binding and, further, increases the relative speed at which movable mast sections 30 and 32 can be moved.

In preferred form, guide bars 66 comprise cylindrical rods, of which a first set 69 is mounted in fixed mast section 28 in longitudinal grooves 68. Grooves 68 are formed in side walls 70 of fixed mast section 28, such as during the extrusion process. Bars 69 are engaged by guide rollers 100, which are rotatably mounted to first movable mast section 30 on shafts 100a. A second set of guide bars 80 are mounted in longitudinal grooves 82 provided on outer surface 84 of side wall 78 of movable mast 30. These guide bars are engaged by guide rollers 86, which are rotatably mounted to fixed mast section 28 on a shaft 86a between respective side walls 88, 90 and an inwardly projecting flange 92, 94, which extends inwardly form side wall 98 of fixed mast section 28. In addition, second movable mast section 32 is preferably guided in first movable mast section 30 on a third set of guide bars 72. Guide bars 72 are similarly mounted in longitudinal grooves 74 provided on inner surface 76 of side wall 78 of first movable mast section 30 and which are engaged by guide rollers 118 which are rotatably mounted to side walls 120 and 122 of mast section 32 on shaft 118a.

Again referring to FIG. 6, second movable mast section 32 also includes a set of guide bars 102 which are mounted in longitudinal grooves 104 provided in outer surface 106 of side wall 108 of movable mast section 32. Guide bars 102 are engaged by another set of guide rollers 110, which are rotatably supported on side wall portions 112 and 114 of movable mast 30 by shaft 110a and which are maintained in their relative position by a spacer 110b. In this manner, mast sections 30 and 32 are guided as they move through passageway 28a of fixed mast section 28 in a manner so that the respective mast sections 30, 32 remain substantially aligned and generally parallel to the longitudinal axis of extension 22a (FIG. 2). As a result, movable mast section 20 and 32 can be moved at greater speeds which further reduces the cycle time.

Figure 7:
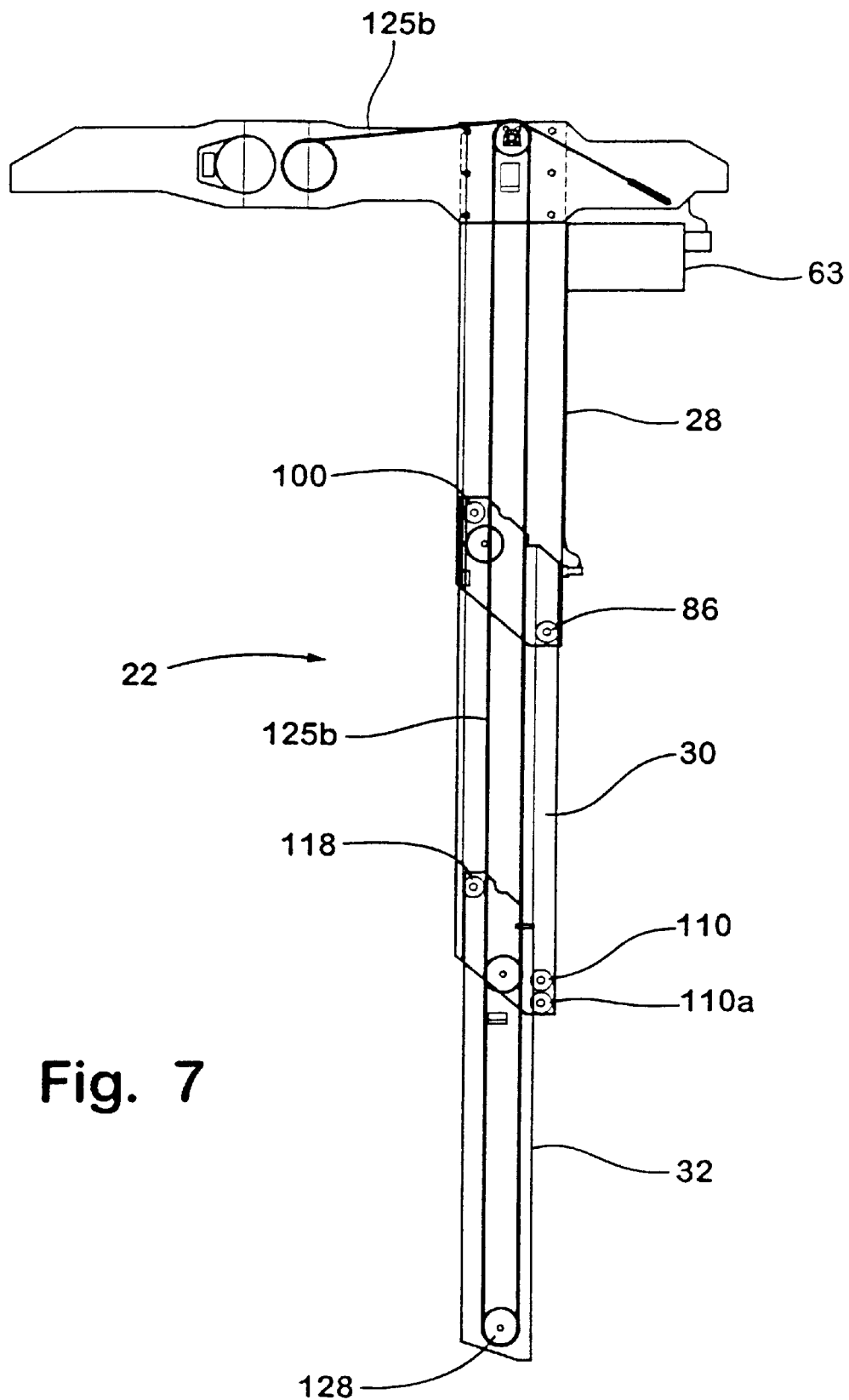
FIG. 7 is an elevation view illustrating the telescoping mast in an extended configuration and, further, illustrating the drive cord of the driver assembly of the load carrier of the present invention.

Furthermore, by way of reference to FIGS. 2 and 7, guide rollers 100 and 86 are vertically staggered. Thus, rollers 100 and 86 and guide bars 69 and 80, in addition to providing lateral restraint of mast section 30 in mast section 28, provide a moment restraint for mast section 30. Similarly, guide rollers 118 and 110 are vertically staggered, which together with guide bars 72 and 102, to form a lateral restraint and moment restraint for movable mast section 32. Optionally and preferably, mast section 30 includes a second set of guide rollers 110a which are positioned below rollers 110 for engaging guide bars 102 to provide further lateral support to movable mast section 32 and, further, resistance to rotation for movable mast section 32.

Figure 10A:
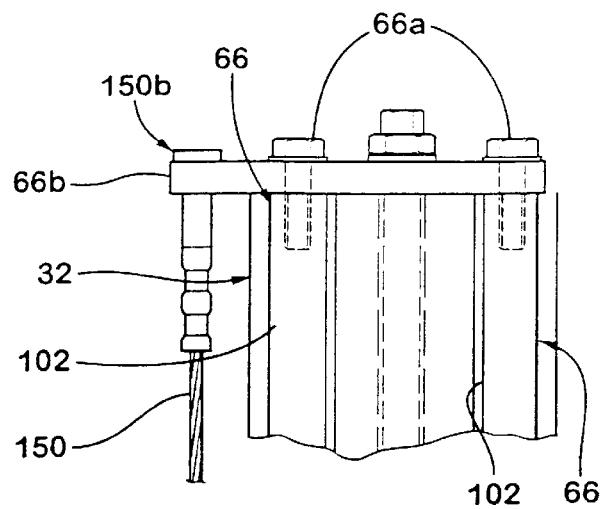
FIG. 10A is an enlarged detailed view of the mounting arrangement of one end of the first synchronizing cord and, further, of the guide rods within the telescoping mast.
Figure 11A:
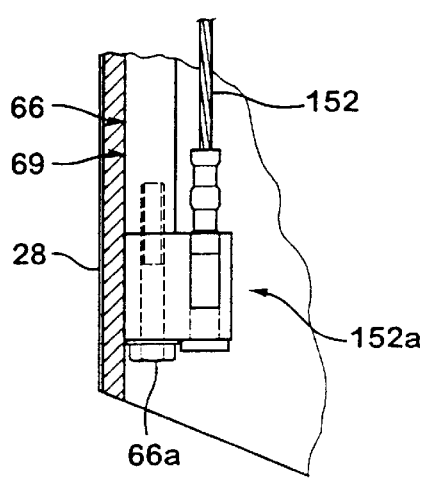

In preferred form, each guide bar 66 is tensioned at both ends by bolts 66a or the like, as illustrated in FIGS. 10A and 11A. As best seen in FIG. 10A, for example, guide bars 102 of mast section 32 are fixed by bolts 66a, which extend into guide bars 102 through a washer plate 66b, which also forms the cord anchor 150b for cord 150. Similarly, referring to FIG. 11A, guide rod bar 69 of fixed mast section 28 is anchored to cord anchor 152a by bolt 66a. By increasing the torque on bolts 66a, the tension in guide bars 102 can be adjusted with the maximum tension achieved when guide bars 66 contact the respective washer plate or cord anchor, as would be understood by those skilled in the art.

As best understood from FIGS. 2–5 and 7, lift assembly 26 includes at least one drive cord 125a and, more preferably, two drive cords 125a and 125b for lowering and raising mast sections 30 and 32. Preferably, drive cords 125a and 125b are arranged and configured such that they bend in a single direction to eliminate back bending in the respective cord; thus, extending the longevity of the drive cords. In preferred form, second drive cord 125b provides a safety or back-up cord in the event that first drive cord 125a breaks. As best seen from FIG. 4, cords 125a and 125b wrap around cord drum 62, which is selectively rotated by drive shaft 60 of motor 59, and then extend over redirection pulleys 126. Drive shaft 60 is coupled to an encoder 65 which is used to track the rotation of drum 62 and, therefore, the position of movable mast section 30 and 32. Encoder 65 generates signals to control box 63, which compares the signals from encoder 65 to the preselected positions for mast section 30 and 32 and generates drive signals to motor 59 until the positions of mast section 30 and 32 match the preselected positions. It should be understood, that control box 63 may be coupled to a manual input device to permit manual adjustment of the position of mast sections 30 and 32.

Figure 6:
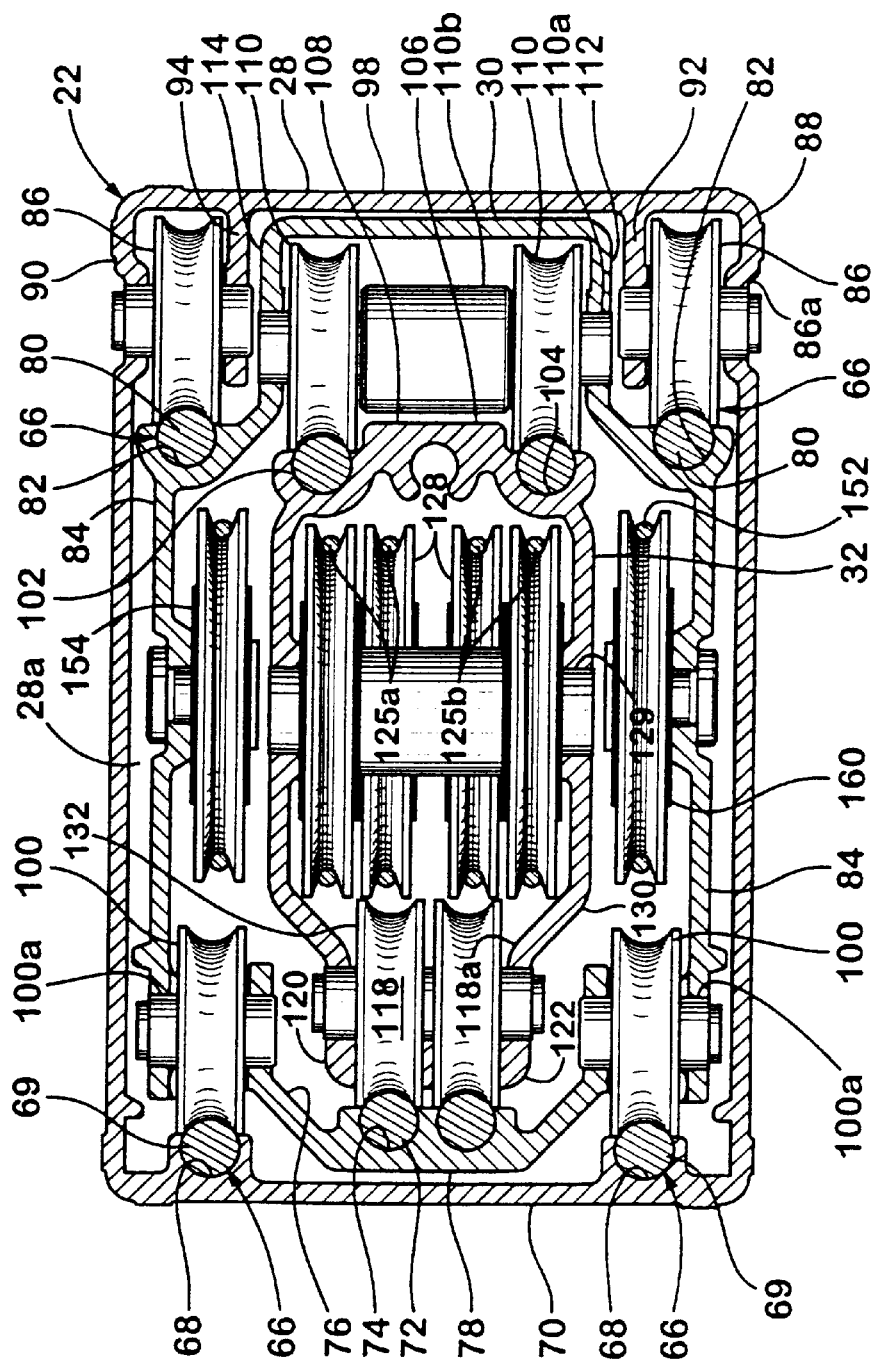
FIG. 6 is an enlarged cross-section view taken along line XII—XII of FIG. 1.

Redirection pulleys 126 are supported on a shaft 127 which is mounted to and extends between side frame members 46 ad 48 of primary load frame member 20. Redirection pulleys 126 direct cords 125a and 125b down the longitudinal passage 32a of second movable mast section 32 to a second set of redirection pulleys 128 which are rotatably supported on second movable mast section 32 by shaft 129 (FIG. 6). Shaft 129 is supported and extends between side walls 130 and 132 of movable mast section 32 at or near the end of mast section 32. Pulleys 128 redirect cords 125a and 125b to a second set of redirection pulleys 134 commonly supported on shaft 127. Redirection pulleys 134 direct cords 125a and 126b to respective cord clamps 136a and 136b, which anchor cords 125a and 125b to load frame member 20.

Figure 5:
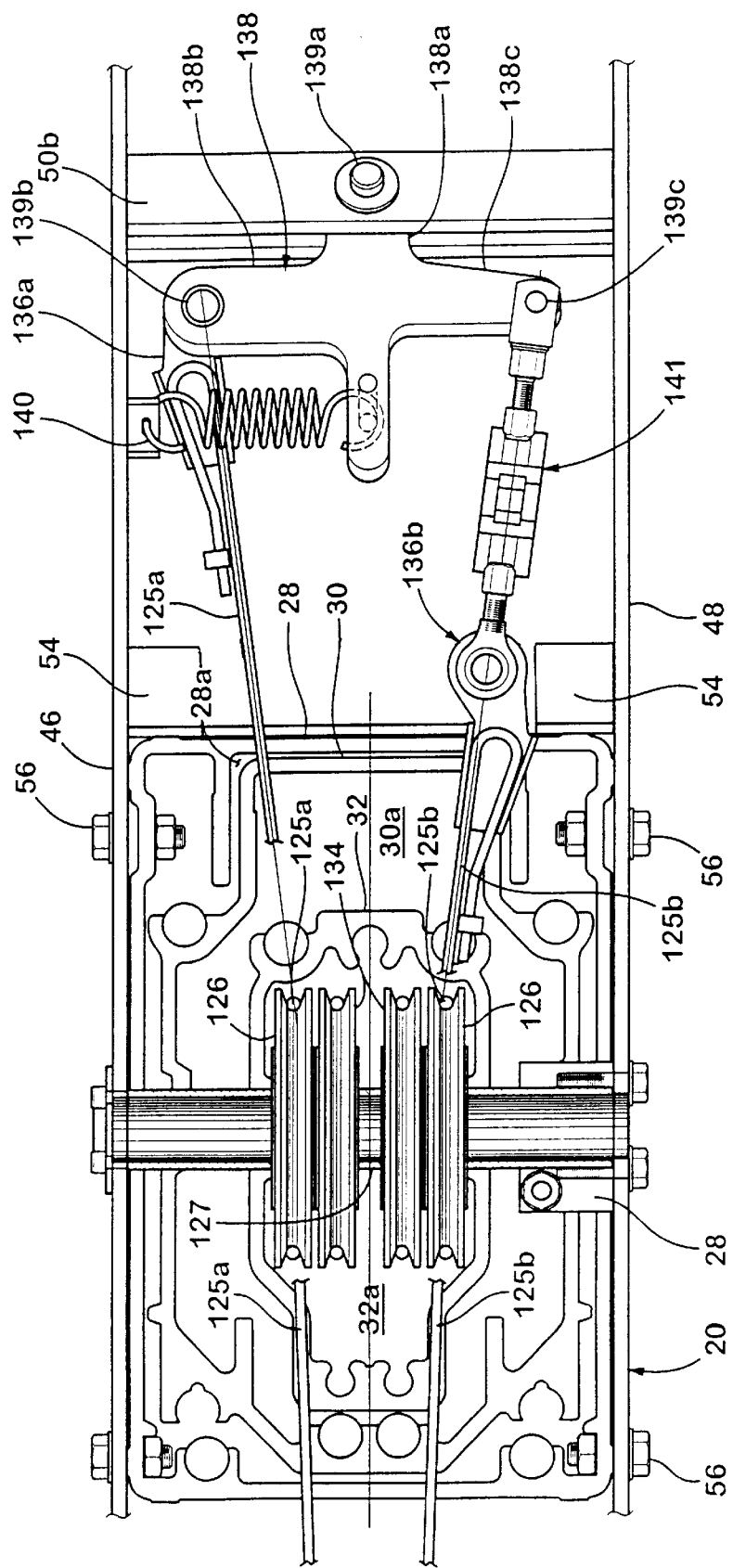
FIG. 5 is an enlarged plan view of the mounting arrangement of the telescoping mast to the load frame member of FIG. 3.

As best seen in FIG. 5, cord clamps 136a and 136b are mounted to load frame member 20 by a pivot beam 138. Pivot beam 138 comprises a cross-shaped member and includes a central leg 138a and transverse arms 138b and 138c. Central leg 138b is mounted to cross-frame member 50b by a pin 139a on one end and biased in a clockwise direction (as viewed in FIG. 5) by a spring 140 which is mounted to its other end. Cord clamps 136a and 136b are mounted to transverse arms 138b and 138c of pivot beam 138 by pins 139b and 139c, respectively. Preferably, clamp 136b includes an adjustable tensioner 141, which is used, together with spring 140, to adjust the tension on cords 125a and 125b, as would be understood by those skilled in the art. Depending on the size of spring 140, the load may be primarily distributed to drive cord 125a while drive cord 125b is used as a back-up or safety cord. Optionally, a sensor 143 may be provided, such as by mounting to load frame member 20, which detects a change in tension in cord 125b. For example, sensor 143 may comprise a strain sensor which contacts tensioner 141 whereby sensor 143 measures the strain in tensioner 141 or alternatively in cord 125b. Preferably, sensor 143 is in communication with control box 63 and generates signals indicating whether cord 125b is tensioned at a level to indicate a failure of cord 125a. Preferably, control box 63 generates a signal based on the signal from sensor 143 so that the operator is informed as to the failure status of drive cord 125a.

Figure 8:
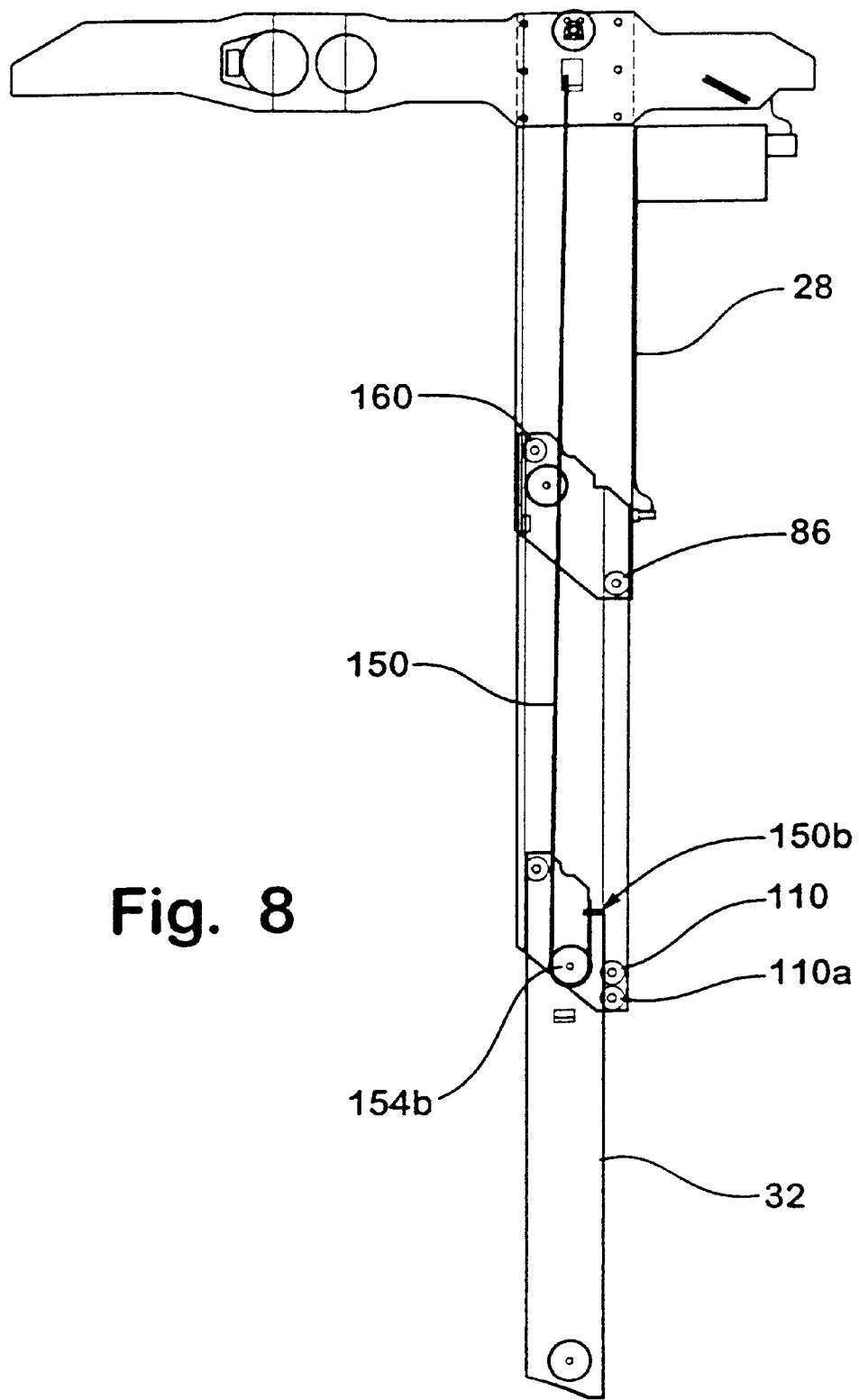
FIG. 8 is a similar view to FIG. 7 illustrating a synchronizing cord arrangement of the telescoping mast.
Figure 9:
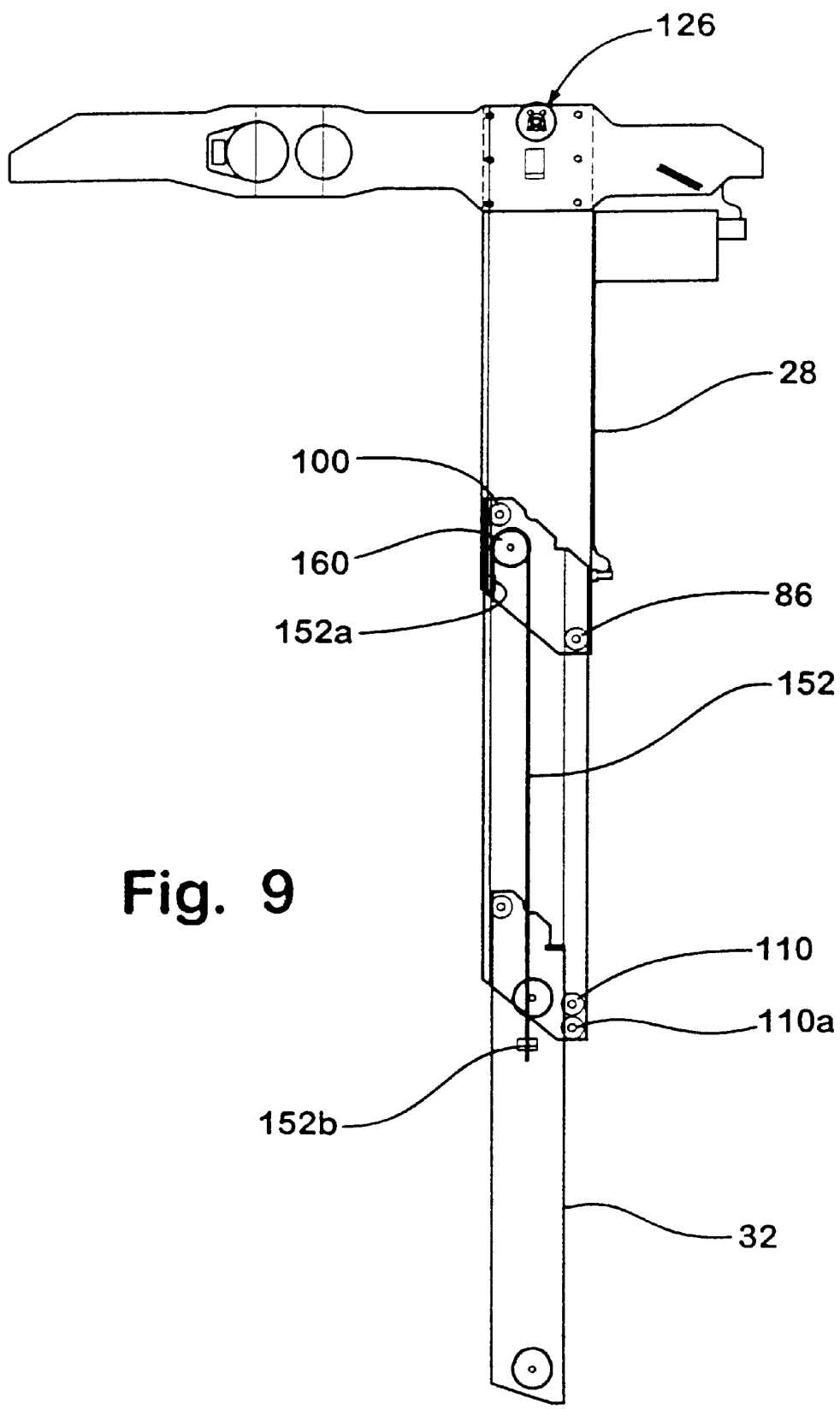
FIG. 9 is a similar view to FIGS. 7 and 8 and illustrates a second synchronizing cord arrangement.
Figure 10B:
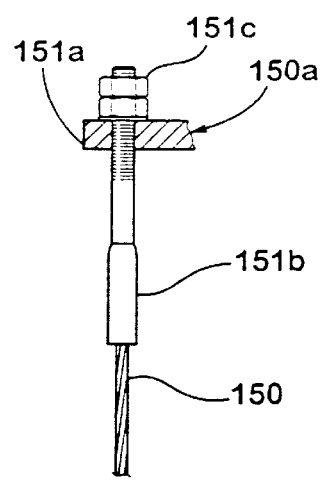
FIG. 10B is an enlarged detailed view of the mounting arrangement of another end of the first synchronizing cord.

In preferred form, telescoping mast 22 is synchronized such that movable mast sections 30 and 32 moved together at substantially the same speed. In other words, when second movable mast section 32 extends from movable mast section 30, movable mast section 30 similarly extends from fixed mast section 28. For example, movable mast sections 30 and 32 are preferably interconnected, such as by a cord. As best seen in FIGS. 8 and 9, mast sections 30 and 32 are synchronized by at least one synchronizing cord 150 and, more preferably, by two synchronizing cords 150, 152. Referring to FIGS. 6 and 8, synchronizing cord 150 extends from its first end from a first cord anchor 150a (FIG. 10B), which is mounted to fixed mast section 28, through passage 30a of movable mast section 30. Anchor 150a includes a rigid base member 151a through which cord 150 extends, a collar 151b which is mounted to cord 150 on one side of base member 151a, and one or more nuts 151c. Nuts 151c are positioned on the other side of base member 151a to engage a portion of collar 151b which extends through base 151a and which, when tightened, anchor cord 150 to base 151a. Cord 150 then extends around a redirection pulley 154b which is mounted to first movable mast section 30 (FIG. 6), and is anchored on its other one end to second movable mast section 32 by a second cord anchor 150b, which is of similar construction to anchor 150a. Anchor 150b is mounted to an upper end of second movable mast section 32 (FIG. 10B). In this manner, when movable mast section 32 is lifted by driver cord 125a, synchronizing cord 150 lifts redirection pulley 154b which in turn lifts movable mast section 30.

Figure 11B:
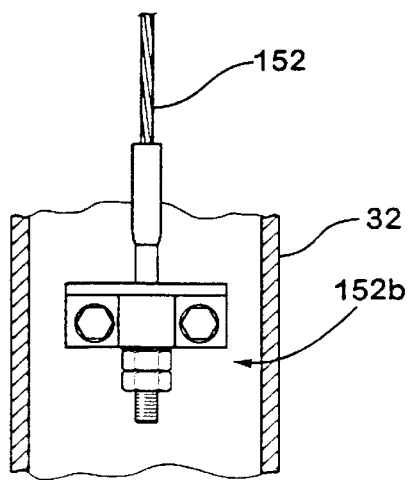

Referring to FIG. 9, second synchronizing cord 152 is anchored on one end to a lower end of fixed mast section 28 by a first cord clamp or anchor 152a (FIG. 11A) and extends upwardly and over a redirection pulley 160 (FIG. 6) which is mounted to wall 84 of first movable mast section 30 in passageway 30a. Redirection pulley 160 directs cord 152 through passageway 30a to second movable mast section 32 where the end of cord 152 is anchored to movable mast section by a second cord clamp or anchor 152b (FIG. 11B). Therefore, as movable mast section 30 moves upwardly (as viewed in FIG. 9), cord 152 further synchronizes the relative movement of both movable mast sections 30, 32.

Referring to FIG. 13, load support frame 24 includes a base frame 164 and a plurality of load supports 165 which can be configured to support a wide variety of components. In the illustrated embodiment, base frame 24 and supports 165 are arranged to support vehicle body 18. Frame 164 includes two side frame members 164a and 164b which are spaced apart and interconnected at one end by a transverse member 164c and a V-shaped mounting member 164d for mounting frame 164 to movable mast section 32, as will be more fully discussed in reference to FIG. 15. Cantilevered from side frame members 164a and 164b are load supports 165 which are mounted on, for example, tubular members 166, which can be varied in length to suit the particular application. Load support frame 24 optionally includes a plurality of bumpers 170a and 170b, which provide lateral support for the component, such as body 18. Bumpers 170a are mounted to side frame members 164a and 164b, with bumper 170b cantilevered from transverse member 164c by, for example, an inverted channel-shaped member 171. Channel-shaped member 171 is mounted to transverse member 164c by an angle member 172. Similarly, the length of channel-shaped member 171 or the location of bumper 170b may be adjusted to suit.

Referring to FIG. 15, V-shaped mounting member 164d includes a taper end 174 (FIG. 14) with transverse mounting openings 174a and 174b, which align with mounting opening 176a and 176b in mast section 32 and receive fasteners, such as bolts for mounting load support frame 24 to the end of movable mast section 32. In addition, mounted to underside of taper section 174 is a transverse copper plate member 178, which is optionally used to ground lift carrier 10, for example wen processes are performed on the components that entail the use of power tools or the like.

While several forms of the invention have been shown and described, other forms will now be apparent to those skilled in the art. For example, the configuration of load frame member 20, load support 24, and mast sections 28, 30, and 32 may be varied. In addition, the location of control box 63 may be varied. Furthermore, the number of cords and guide rods (and corresponding guide rollers) may be increased. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

We claim:

1. A load carrier for supporting, raising, and lowering a load, said load carrier comprising:

a frame member adapted for being movably supported by a rail;

a telescoping mast supported by said frame member;

a support frame supported by said telescoping mast, said support frame being adapted for supporting the load thereby, said telescoping mast including at least one fixed mast section and at least one movable mast section, said support frame being coupled to said movable mast section, said movable mast section being supported for movement between a plurality of extended positions in which said support frame is lowered and raised with respect to said frame member and said fixed mast section, said movable mast section being guided by said fixed mast section when said movable mast section is moved to its extended positions; and a driver selectively moving said movable mast section to said extended positions, said movable mast section including a lift sheave, said driver including at least one cord extending through said movable mast section and around said lift sheave for raising and lowering said movable mast section with respect to said fixed mast section and said frame member, and said cord being arranged whereby said cord bends in a single direction to eliminate back bending in said cord and thereby increasing the longevity of said cord.

2. The load carrier according to claim 1, wherein said telescoping mast includes a second movable mast section movably mounted in said at least one movable mast section.

3. The load carrier according to claim 2, wherein said movable mast sections are synchronized wherein said movable mast sections move at generally the same speed in the same direction.

4. The load carrier according to claim 1, wherein said fixed and movable mast sections comprise extruded sections.

5. The load carrier according to claim 1, wherein said fixed mast section includes an interior passageway, said movable mast section being positioned in and moving through said interior passageway when said movable mast section is moved to said extended positions.

6. The load carrier according to claim 5, wherein said movable mast section is guided by a plurality of guide bars when said movable mast section is moved through said interior passageway.

7. The load carrier according to claim 6, wherein said fixed mast section includes a first set of said guide bars, and said movable mast including a second set of said guide bars.

8. The load carrier according to claim 6, wherein said guide bars are tensioned to reduce the play between said movable mast section and said fixed mast section.

9. The load carrier according to claim 8, wherein said guide bars are tensioned at their opposed ends.

10. A load carrier for supporting, raising, and lowering a load, said load carrier comprising:

a frame member adapted for being movably supported by a rail;

a telescoping mast supported by said frame member;

a support frame supported by said telescoping mast, said support frame being adapted for supporting the load thereby, said telescoping mast including at least one fixed mast section and at least one movable mast section, said support frame being coupled to said movable mast section, said movable mast section being supported for movement between a plurality of extended positions in which said support frame is lowered and raised with respect to said frame member and said fixed mast section, said movable mast section being guided by said fixed mast section when said movable mast section is moved to its extended positions, said fixed mast section includes an interior passageway, said movable mast section being positioned in and moving through said interior passageway when said movable mast section is moved to said extended positions, said movable mast section being guided by a plurality of guide bars when said movable mast section moves through said interior passageway, said fixed mast section including a first set of said guide bars, and said movable mast including a second set of said guide bars, said fixed mast section and said movable mast section each include a corresponding set of guide rollers for engaging said guide bars whereby said guide rollers and said guide bars guide said movable mast section to move to its extended positions; and a driver selectively moving said movable mast section to said extended positions, said driver including at least one cord for raising and lowering said movable mast section with respect to said fixed mast section and said frame member, and said cord being arranged whereby said cord bends in a single direction to eliminate back bending in said cord and thereby increasing the longevity of said cord.

11. The load carrier according to claim 10, wherein said guide bars comprise cylindrical rods.

12. The load carrier according to claim 10, wherein said guide rollers comprise guide sheaves.

13. The load carrier according to claim 10, wherein said guide bars are tensioned to reduce the play between said movable mast section and said fixed mast section.

14. The load carrier according to claim 13, wherein said guide bars are tensioned at their opposed ends.

15. The load carrier according to claim 8, wherein said telescoping mast includes a second movable mast section movably mounted in said at least one movable mast section.

16. The load carrier according to claim 15, wherein said first and second movable mast sections are synchronized to move substantially in the same direction at about the same speed by a pair of synchronizing cords.

17. The load carrier according to claim 16, wherein one of said cords is coupled to said first and second mast sections, and a second of said cords is coupled to a fixed portion of said load carrier and to one of said first and second movable mast sections.

18. The load carrier according to claim 10, wherein said driver includes a second driver cord, said second drier cord being arranged to bend in a single direction to thereby eliminate back bending of said second driver cord.

19. A load carrier for supporting, raising, and lowering a load, said load carrier comprising:
- a frame member adapted for being movably supported by a rail;
- a telescoping mast supported by said frame member;
- a support frame supported by said telescoping mast, said support frame being adapted for supporting the load thereby, said telescoping mast including at least one fixed mast section and first and second movable mast sections, said support frame being mounted to said second movable mast section, said first and second movable mast sections being supported for movement between extended positions in which said support frame is lowered and raised with respect to said frame member and said fixed mast section, said first movable mast section being guided by said fixed mast section and said second movable mast section being guided by said first movable mast section when said first and second movable mast sections are moved to their extended positions, wherein said first and second movable mast sections are synchronized to move substantially in the same direction at about the same speed by a pair of synchronizing cords, one of said cords being coupled to said first and second mast sections, and a second of said cords being coupled to a fixed portion of said load carrier and one of said first and second movable mast sections; and
- a driver moving said first and second movable mast sections to thereby lift and lower said support frame, said first and second movable mast sections being synchronized to move substantially in the same direction at about the same speed by at least one synchronizing cord.

20. The load carrier according to claim 19, wherein at least one of said cords is arranged to bend about a single direction to eliminate back bending in said at least one of said cords.

21. The load carrier according to claim 20, wherein each of said cords is arranged to bend in a single direction to eliminate back bending in each of said cords to thereby increase the longevity of said cords.

22. The load carrier according to claim 16, wherein said driver includes a driver cord, said driver cord for raising and lowering said movable mast sections with respect to said fixed mast section and said frame member.

23. The load carrier according to claim 22, wherein said driver cord is arranged whereby said driver cord bends in a single direction to eliminate back bending in said driver cord thereby increasing the longevity in said driver cord.

24. The load carrier according to claim 19, wherein said first and second mast sections are guided along said fixed mast section by a plurality of guide bars to move between their extended positions.

25. The load carrier according to claim 24, wherein said guide bars comprise metal guide bars.

26. The load carrier according to claim 24, wherein each of said guide bars are tensioned to minimize the play between said movable mast sections and said fixed mast section.

27. The load carrier according to claim 24, wherein said mast sections comprise extruded aluminum mast sections.

28. The load carrier according to claim 19, wherein said driver includes a second driver cord, said second driver cord being arranged to bend in a single direction to thereby eliminate back bending of said second driver cord.

29. The load carrier according to claim 19, wherein each of said cords comprises one of a cable and a rope.

30. The load carrier according to claim 19, further in combination with a support rail, said frame member being movably supported by said support rail.

31. A load carrier for supporting, raising, and lowering a load, said load carrier comprising:
- a frame member adapted for being movably supported by a rail;
- a telescoping mast supported by said frame member;
- a support frame supported by said telescoping mast, said support frame being adapted for supporting the load thereby, said telescoping mast including at least one fixed mast section and first and second movable mast sections, said support frame being mounted to said second movable mast section, said first and second movable mast sections being supported for movement between extended positions in which said support frame is lowered and raised with respect to said frame member and said fixed mast section, said first movable mast section being guided by said fixed mast section and said second movable mast section being guided by said first movable mast section when said first and second movable mast sections are moved to their extended positions, said first and second mast sections being guided along said fixed mast section by a plurality of guide bars to move between their extended positions, wherein said fixed mast section includes a first set of said plurality of guide bars, said first movable mast section including a second set of said plurality of guide bars, and said first and second guide bars guiding said first movable mast section along said fixed mast section; and
- a driver moving said first and second movable mast sections to thereby lift and lower said support frame, said first and second movable mast sections being synchronized to move substantially in the same direction at about the same speed by at least one synchronizing cord.

32. The load carrier according to claim 31, wherein said first movable mast section includes a third set of said plurality of guide bars, said second mast section being guided along said first movable section by said third guide bars.

33. The load carrier according to claim 32, wherein said fixed mast section includes a corresponding set of guide rollers for engaging said second set of guide bars of said first movable mast section.

34. The load carrier according to claim 33, wherein said guide bars comprise cylindrical guide rods.

35. The load carrier according to claim 33, wherein said first movable mast section includes a corresponding set of guide rollers for engaging said first set of guide bars of said fixed mast section to guide said first movable mast section along said fixed mast section.

36. The load carrier according to claim 35, wherein said second movable mast section includes a corresponding set of guide rollers for engaging said third set of said guide bars of said first movable mast section.

37. The load carrier according to claim 36, wherein said second movable mast section includes a fourth set of said plurality of guide bars, said first movable mast section including a corresponding set of guide rollers for guiding along said fourth set of guide bars of said second movable mast section.

38. The load carrier according to claim 37, wherein said guide rollers comprise guide sheaves.

39. A load carrier for supporting, raising, and lowering a load, said load carrier comprising:
a frame member adapted for being movably supported by a rail;
a telescoping mast supported by said frame member;
a support frame supported by said telescoping mast, said support frame being adapted for supporting the load thereby, said telescoping mast including at least one fixed mast section and first and second movable mast sections, said support frame being supported by said second movable mast section, said first and second movable mast sections being supported for movement in said fixed mast between extended positions in which said support frame is lowered with respect to said frame member and retracted positions in which said support frame is raised with respect to said frame member;
said telescoping mast including a plurality of guide rods, said first and second movable masts being guided by said guide rods when moved between said extended and retracted positions; and
a driver including at least one cord extending through said fixed mast section and said first and second movable mast sections, and said second movable mast section including a lift sheave, said cord extending around said lift sheave and returning through said first and second movable mast sections and said fixed mast section for lowering and raising said first and second movable mast sections to thereby lower and raise the load.

40. The load carrier according to claim 39, wherein said fixed mast section includes at least one first guide rod of said plurality of guide rods, said first movable section including at least one second guide rod and at least one third guide rod of said plurality of guide rods, said second movable mast section including at least one fourth guide rod of said plurality of guide rods, said first movable mast section being guided by said first and second guide rods and said second movable mast being guided by said third and fourth guide rods to move between said extended and retracted positions.

41. The load carrier according to claim 40, wherein said fixed mast section includes a pair of said first guide rod.

42. The load carrier according to claim 40, wherein said second movable mast section includes a pair of fourth guide rod.

43. The load carrier according to claim 40, wherein each of said first and second movable mast sections includes corresponding guide sheaves, said guide sheaves guiding said first and second mast sections along said guide rods.

44. The load carrier according to claim 40, wherein first movable mast section includes a pair of said second guide rod.

45. The load carrier according to claim 40, wherein first movable mast section includes a pair of said third guide rod.

46. The load carrier according to claim 39, wherein said first and second movable mast sections are interconnected whereby said first and second mast sections move substantially in the same direction at about the same speed.

47. The load carrier according to claim 39, further comprising a support rail, said support rail supporting said frame member.

48. The load carrier according to claim 47, wherein said frame member is suspended by said support rail.

49. The load carrier according to claim 48, wherein said frame member is suspended from said support rail by a driver assembly and by an idler trolley assembly, said driver assembly selectively moving said frame member along said rail.

50. The load carrier according to claim 49, wherein said support rail comprises a monorail.

51. The load carrier according to claim 39, further comprising at least synchronizing cord, wherein said first and second movable mast sections are synchronized to move substantially in the same direction at about the same speed by said at least one synchronizing cord.

52. The load carrier according to claim 39, wherein said guide rods are tensioned to minimize piy between said movable mast sections and said fixed mast section.

53. A load carrier for supporting, raising, and lowering a load, said load carrier comprising:
a frame member adapted for being movably supported by a rail;
a telescoping mast supported by said frame member;
a support frame supported by said telescoping mast, said support frame being adapted for supporting the load thereby, said telescoping mast including at least one fixed mast section and at least one movable mast section, said support frame being coupled to said movable mast section, said movable mast section being supported for movement between a plurality of extended positions in which said support frame is lowered and raised with respect to said frame member and said fixed mast section, said movable mast section being guided by said fixed mast section when said movable mast section is moved to its extended positions; and
a driver selectively moving said movable mast section to said extended positions, said driver including at least one cord for raising and lowering said movable mast section with respect to said fixed mast section and said frame member, wherein said movable mast section includes a lift sheave, said driver including a cord drum, said cord extending from said cord drum over a redirection sheave, down said mast and around said lift sheave, said cord extending from said lift sheave over a second redirection sheave to a cord clamp whereby said cord raises or lowers said movable mast section when said drum rotates, and said cord being arranged whereby said cord bends in a single direction to eliminate back bending in said cord and thereby increasing the longevity of said cord.

54. The load carrier according to claim 53, wherein said driver includes a motor, said motor driving said drum.

55. The load carrier according to claim 53, wherein said movable mast section is guided by a plurality of guide bars when said movable mast section is moved through said interior passageway.

56. The load carrier according to claim 55, wherein said fixed mast section includes a first set of said guide bars, and said movable mast including a second set of said guide bar.

57. The load carrier according to claim 56, wherein said fixed mast section and said movable mast section each include a corresponding set of guide rollers for engaging said guide bars whereby said guide rollers and said guide bars guide said movable mast section to move to its extended positions.

58. The load carrier according to claim 55, wherein said guide bars comprise cylindrical rods.

59. The load carrier according to claim 55, wherein said guide bars are tensioned to reduce the play between said movable mast section and said fixed mast section.

60. The load carrier according to claim 53, wherein said telescoping mast includes a second movable mast section movably mounted in said at least one movable mast section.

61. The load carrier according to claim 60, wherein said movable mast sections are synchronized wherein said movable mast sections move at generally the same speed in the same direction.

* * * * *

UNITED STATES PATENT AND TRADEMARK OFFICE
CERTIFICATE OF CORRECTION

PATENT NO. : 6,571,970 B1
DATED : June 3, 2003
INVENTOR(S) : Hans-Gerd Spoeler and Juergen Cittrich It is certified that error appears in the above-identified patent and that said Letters Patent is hereby corrected as shown below:

Column 4,
Line 21, "11(a)" should be -- 11A --
Line 21, "11(b)" should be -- 11B --

Column 11,
Line 5, "drier" should be -- driver --

Column 14,
Line 7, "piy" should be -- play --

Signed and Sealed this

Twenty-fifth Day of January, 2005

JON W. DUDAS
*Director of the United States Patent and Trademark Office*